United States Patent
Xu et al.

(10) Patent No.: US 7,616,401 B2
(45) Date of Patent: Nov. 10, 2009

(54) METAL INJECTION MOLDED BASE FOR A DATA STORAGE SYSTEM

(75) Inventors: Mo Xu, Singapore (SG); Niroot Jierapipatanakul, Singapore (SG); Wei Rhen Spencer Hoon, Singapore (SG)

(73) Assignee: Seagate Technology LLC, Scotts Valley, CA (US)

( * ) Notice: Subject to any disclaimer, the term of this patent is extended or adjusted under 35 U.S.C. 154(b) by 598 days.

(21) Appl. No.: 11/241,038

(22) Filed: Sep. 30, 2005

(65) Prior Publication Data

US 2008/0124239 A1    May 29, 2008

(51) Int. Cl.
 *G11B 5/012* (2006.01)
(52) U.S. Cl. .................................... 360/97.01
(58) Field of Classification Search ........................ None
  See application file for complete search history.

(56) References Cited

U.S. PATENT DOCUMENTS

| | | | |
|---|---|---|---|
| 5,025,335 A | 6/1991 | Stefansky | 360/97.01 |
| 5,025,336 A | 6/1991 | Morehouse et al. | |
| 5,396,384 A | 3/1995 | Caldeira et al. | |
| 5,483,398 A | 1/1996 | Boutaghou | 360/97.02 |
| 5,745,834 A * | 4/1998 | Bampton et al. | 419/37 |
| 6,023,392 A | 2/2000 | Kim | 360/97.01 |
| 6,034,841 A | 3/2000 | Albrecht et al. | |
| 6,226,143 B1 * | 5/2001 | Stefanksy | 360/97.01 |
| 6,693,767 B1 | 2/2004 | Butler | 360/97.01 |
| 6,900,961 B1 | 5/2005 | Butler | 360/97.01 |
| 6,990,727 B1 * | 1/2006 | Butler et al. | 29/603.03 |
| 2003/0071382 A1 | 4/2003 | Neal | 264/40.5 |
| 2003/0081347 A1 | 5/2003 | Neal et al. | 360/97.01 |
| 2003/0218827 A1 | 11/2003 | Teo et al. | 360/97.01 |
| 2003/0218958 A1 | 11/2003 | Yumitori et al. | 369/75.1 |

FOREIGN PATENT DOCUMENTS

WO    0121347 A1    3/2001

OTHER PUBLICATIONS

Written Opinion dated Mar. 9, 2007 for Danish Application No. SG 200506426-6.
Search Report dated Feb. 22, 2007 for Danish Application No. SG 200506426-6.

* cited by examiner

*Primary Examiner*—Mark Blouin
(74) *Attorney, Agent, or Firm*—Leanne Taveggia Farrell; Westman, Champlin & Kelly, P.A.

(57) ABSTRACT

The present invention provides a data storage system. The data storage system includes a metal injected molded base. The metal injection molded base includes a metal injection molded platform and at least one metal injection molded three-dimensional feature. The at least one metal injection molded three-dimensional feature is formed integrally and simultaneously with the metal injection molded platform. The at least one three-dimensional feature configured to mount data storage system components to the platform.

12 Claims, 5 Drawing Sheets

METAL INJECTION MOLDED BASE FOR A DATA STORAGE SYSTEM

FIELD OF THE INVENTION

The present invention relates generally to data storage systems. In particular, the present invention relates to a base for a data storage system.

BACKGROUND OF THE INVENTION

Disc drives are typical data storage systems. A disc drive includes a rigid housing having a base and a cover that encloses a variety of components. The components include one or more discs having data surfaces that are coated with a magnetizable medium for storage of digital information in a plurality of circular, concentric data tracks. The discs are mounted on a spindle motor that causes the discs to spin and the data surfaces of the discs to pass under respective aerodynamic bearing disc head sliders. The sliders carry magnetic transducers, which write information to and read information from the data surfaces of the discs.

The components also include an actuator mechanism that moves the sliders across the data surfaces of the discs. The actuator mechanism includes a motor, such as a voice coil motor (VCM), a track accessing arm and suspensions that support the sliders. The voice coil motor is operated so as to move the actuator mechanism about an actuator pivot center such that the sliders move from track-to-track across the data surface of a disc.

The base of the disc drive is a complex three-dimensional structure that typically provides a rigid and precise platform upon which multiple mechanical and electronic components, as discussed above, are mounted. Typically, small form factor disc drives include a base made of stamped steel. A stamped steel base can be cost effective and includes a high strength. Stamped steel bases, however, have many limitations. It is difficult to achieve variations in thickness at different portions of the base as well as it being practically impossible to achieve small corner radiuses without machining the base after it has been stamped. In fact, a stamped base design includes through holes where high thickness variation ratios are required. The existence of through holes introduces additional sealing costs and potential leakage problems.

A base includes a variety features for various applications of a disc drive that can not be achieved through pure stamping technology. Typically, force fit components are coupled to a stamped base to satisfy these disc drive application needs. However, forming suitable threads in the base for use in receiving force fit components is difficult. Imperfectly formed threads cause potential leakage problems, corrosion issues on the interface and possible loose fittings between the base and the force fit components. Many times features that should be mounted to the base (such as the breather filter support, carbon filter support, latches, crash stop and etc) are mounted to the top cover to mitigate many of the problems associated with the stamping process. However, mounting such features to the top cover introduces additional disc drive dimensional problems.

The above-mentioned problems associated with stamped steel bases have not posed problems for large disc drives. Normally, large disc drives are made from an aluminum die casting process. However, an aluminum die cast base for small form factor disc drives is not an ideal design for performance and cost reasons. Examples of problems for an aluminum die cast base include low material stiffness and the lack of magnetic properties.

Embodiments of the present invention provide solutions to these and other problems, and offer other advantages over the prior art.

SUMMARY OF THE INVENTION

The present invention provides a data storage system. The data storage system includes a metal injected molded base. The metal injection molded base includes a metal injection molded platform and at least one metal injection molded three-dimensional feature. The at least one three-dimensional features is formed integrally and simultaneously with the platform.

One of the three-dimensional features is a metal injection molded motor housing. The motor housing is formed integrally and simultaneously with the injection molded platform. The motor housing is configured to house a motor that rotates a medium about an axis.

The present invention also provides a method for forming an injection molded base of a data storage system. The method includes mixing a metal powder with a polymer binding material. The mixture is injected into a mold to provide the base. The mold is adapted to form a platform and adapted to form three-dimensional features that are integral with the platform. The mold is heated in an oven for de-bonding and the mold is heated in an oven for sintering.

Other features and benefits that characterize embodiments of the present invention will be apparent upon reading the following detailed description and review of the associated drawings.

DETAILED DESCRIPTION OF ILLUSTRATIVE EMBODIMENTS

Figure 1:
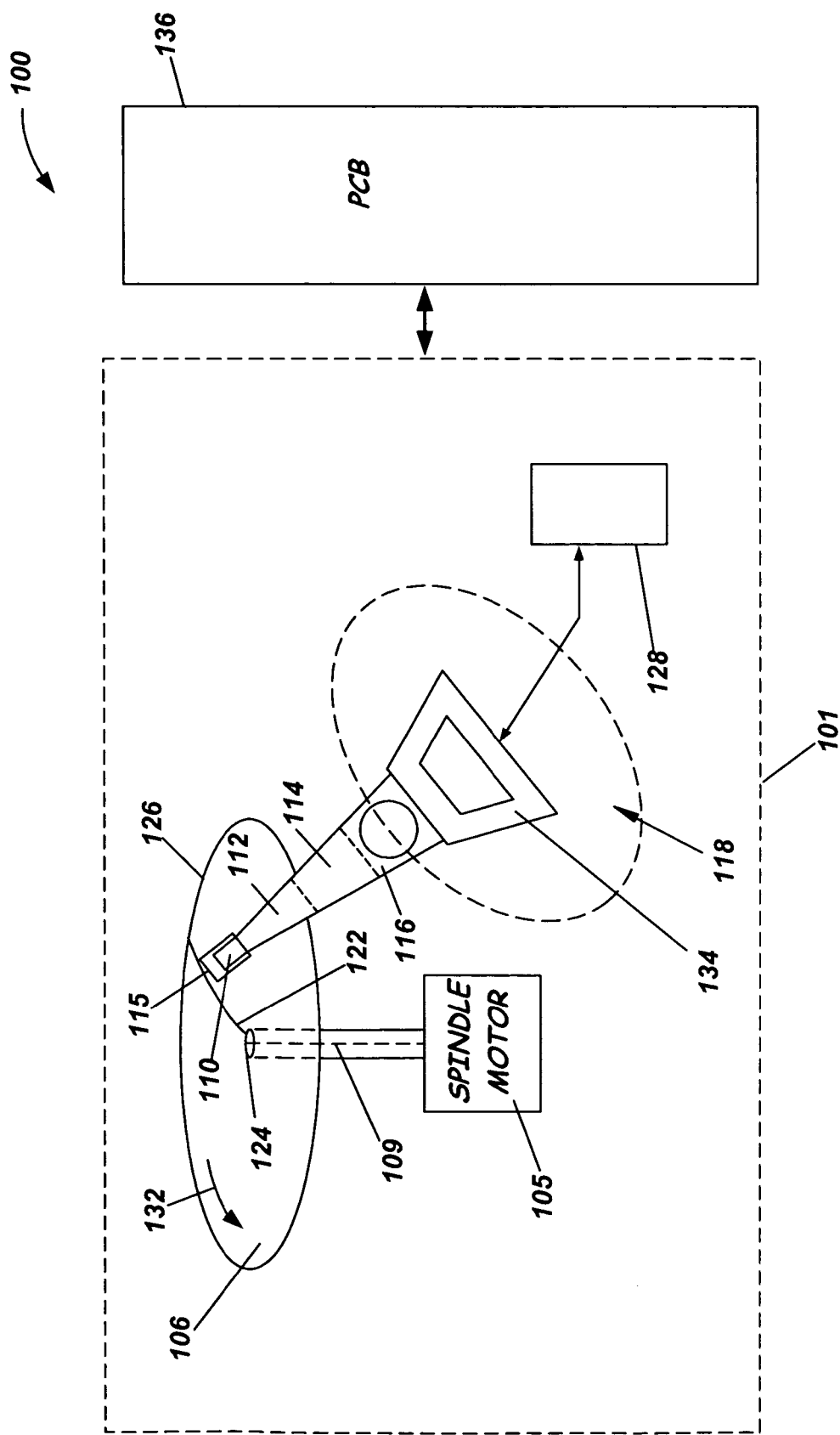
FIG. 1 illustrates a simplified schematic diagram of a data storage system.

FIG. 1 is a simplified schematic diagram of a disc drive 100 in which embodiments of the present invention are useful. Disc drives are common data storage systems. Disc drive 100 includes an enclosure 101. Enclosure 101 includes a base (not shown in FIG. 1) and a top cover (not shown). Disc drive 100 includes a disc 107. Those skilled in the art should recognize that disc drive 100 can contain a single disc, as illustrated in FIG. 1, or multiple discs included in a disc pack. As illustrated in FIG. 1, disc 107 is mounted on a spindle motor 105 for rotation about central axis 109. Each disc surface has an associated slider 110, which carries a read/write head for communication with the surface of the disc.

Each slider 110 is supported by a suspension 112 which is in turn attached to a track accessing arm 114 of an actuator mechanism 116. Actuator mechanism 116 is rotated about a shaft by a voice coil 134 of a voice coil motor 118. As voice coil motor 118 rotates actuator mechanism 116, slider 110 moves in an arcuate path 122 between a disc inner diameter 124 and a disc outer diameter 126. While FIG. 1 illustrates one manner of actuating a data head proximate a data storage medium, the present invention, however, is applicable to data storage systems that use other techniques.

Disc drive 100 also includes a printed circuit board (PCB) 136. PCB 136 is located outside enclosure 101. In general, PCB 136 is mounted to an outer surface of a base of enclosure 101. PCB 136 supports a plurality of printed circuit board components (not shown in FIG. 1). The printed circuit board components are configured to couple to components enclosed within enclosure 101, such as spindle motor 105, slider 110, actuator mechanism 116 and voice coil motor 118.

Typically, a base of a small form factor disc drive is formed by stamping steel. A stamped steel base of a small form factor disc drive include many advantages, such as cost effectiveness, high material strength and the demonstration of magnetic properties. The magnetic properties of the stamped steel base allow the formation of a portion of a magnetic loop of a voice coil motor, such as voice coil motor 118 of FIG. 1, or a spindle motor, such as spindle motor 105 of FIG. 1. However, a stamped base of a small form factor disc drive also includes some limitations. For example, it is difficult to achieve variations in thickness at different portions of the stamped base. This example limitation consequently results in the need to use force fit components that couple to the stamped base of a small form factor disc drive to satisfy different disc drive application needs. In addition, this example limitation consequently results in the inclusion of through holes where high thickness variation ratios are required.

Figure 2:
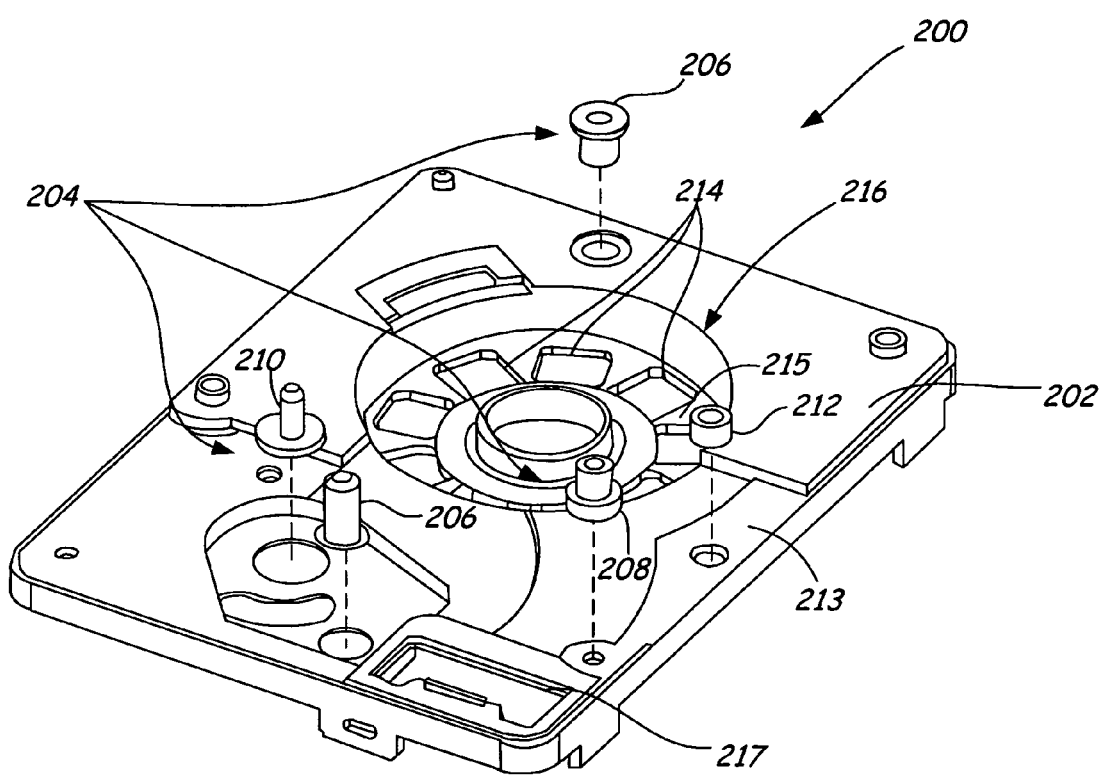
FIG. 2 illustrates a top perspective view of force fit components exploded from a stamped base of a data storage system.
Figure 3:
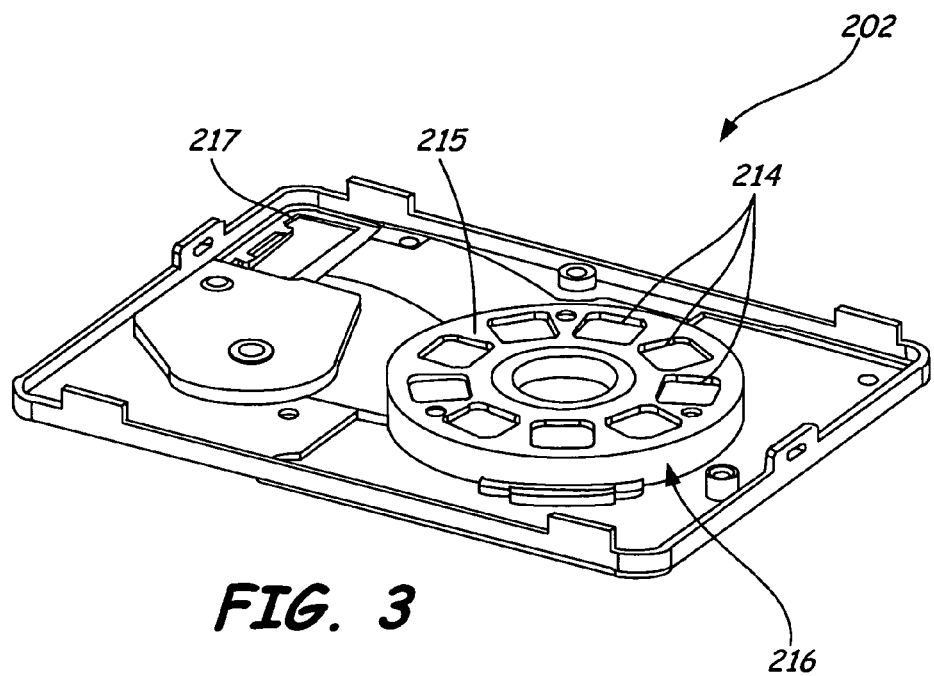
FIG. 3 illustrates a top perspective view of force fit components assembled to a stamped base of a data storage system.

FIG. 2 illustrates a top perspective view of an example plurality of force fit components 204 exploded from an example stamped base 202 of a disc drive. FIG. 3 illustrates a bottom perspective view of the example stamped base 202. Base 202, illustrated in FIGS. 2 and 3, is stamped to form various surface geometries. Force fit components 204 of base 202 are needed to support various elements of data storage system 200 that can not be formed with a pure stamping technology. For example, force fit components 204 include printed circuit board (PCB) screw nuts 206 for attaching a printed circuit board (PCB), such as PCB 136 illustrated in FIG. 1, to base 202. Other examples includes a ramp stopper 208, an actuator shaft 210 for supporting an actuator mechanism, such as actuator mechanism 116 illustrated in FIG. 1, and a ramp screw nut 212 for attaching a ramp 213 to base 202.

As illustrated in FIG. 2 and more clearly in FIG. 3, stamped base 202 of data storage system 200 includes through holes where high thickness variation ratios are required. In particular, the stamping technology requires that through holes 214 are incorporated into a floor 215 of motor housing 216. A high thickness variation is needed to accommodate the spindle motor stator coils or windings. After the spindle motor is assembled within motor housing 216, through holes 214 located on floor 215 need to be sealed. The existence of through holes 214 introduces additional costs for sealing as well as potential ambient air and humidity leakage internal to the enclosure of data storage system 200. In addition, through holes 214 cause the local stiffness of motor housing 216 of base 202 to be low. A lowered stiffness in the spindle motor housing will limit the external shock that a spindle motor can withstand and/or introduce vibration and acoustic problems to a data storage system.

In addition to it being difficult to achieve variations in thickness at different portions of the stamped base, it is also, for all practicalities, impossible to achieve small corner radiuses of the base after it has been stamped. Small corner radiuses help form proper interfaces between the base and a drive component. For example, small corner radiuses of a voice coil motor connector hole 217 are desirable for attachment of a voice coil motor. However, performing a second step of machining when forming a base of a small form factor disc drive also contributes to the cost ineffectiveness of the stamped base.

Figure 4:
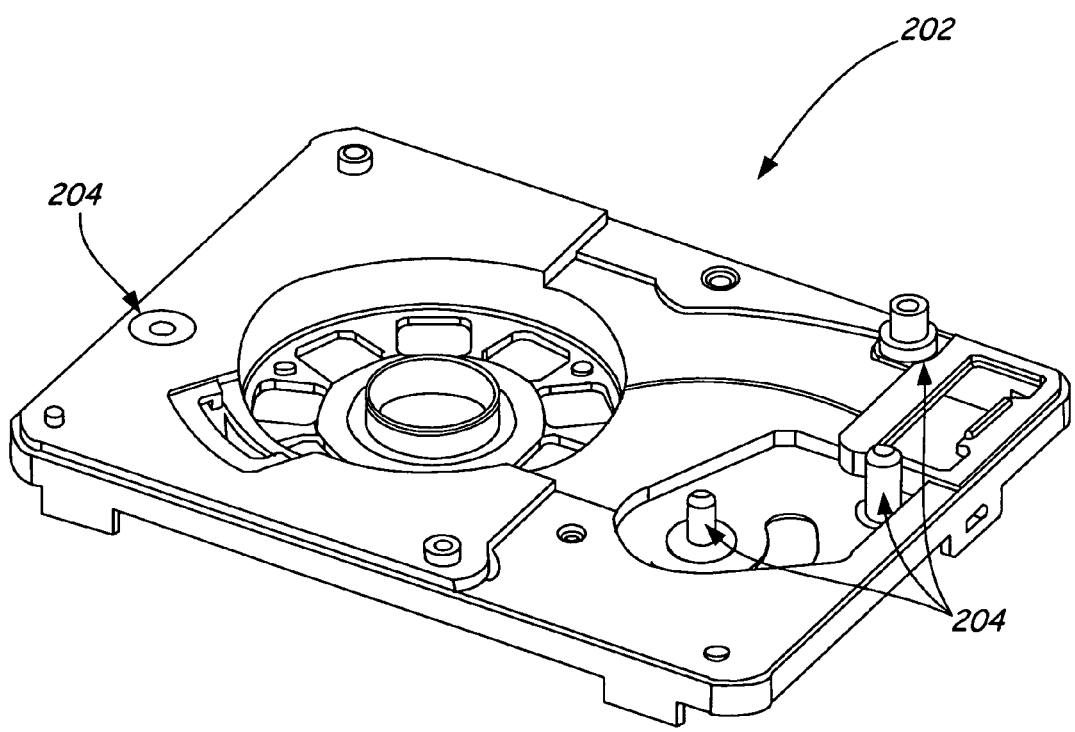
FIG. 4 illustrates a bottom perspective view of force fit components assembled to a stamped base of a data storage system.

FIG. 4 illustrates a top perspective view of stamped base 202 after assembly of the plurality of force fit components 204. In addition to the above-mentioned limitations, the assembly of force fit components 204 to base 202 provides additional limitations. Forming suitable threads in base 202 for use in receiving force fit components 204 is difficult. Imperfect threads result in potential leakage problems, corrosion issues and possible loose fittings between force fit components 204 and base 202.

Figure 5:
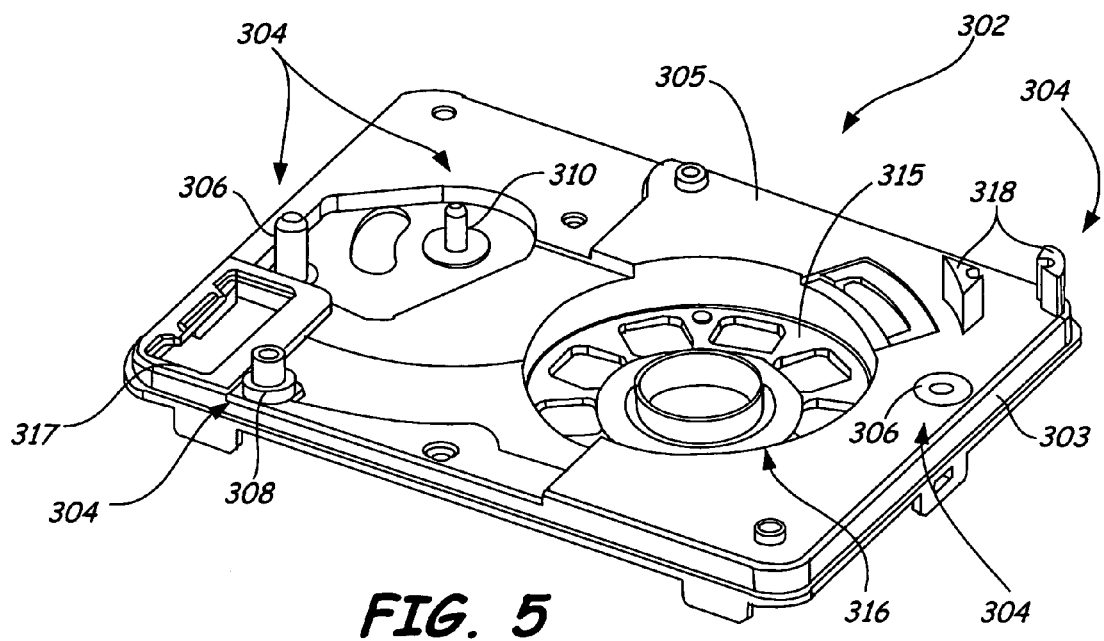
FIG. 5 illustrates a top perspective view of a metal injection molded base of a data storage system.

FIG. 5 illustrates a top perspective view of a metal injection molded (MIM) base 302 of a data storage system in accordance with embodiments of the present invention. MIM base 302 overcomes much of the limitations of the stamping and aluminum die casting technologies previously discussed as well as retains benefits of each of those technologies. MIM base 302 can be made of a non-magnetic metal or a magnetic metal. Example non-magnetic metals for MIM base 302 include stainless steel, cold rolled steel, aluminum alloys and other metal alloys. Such materials have a high modulus and, thus, have properties of high stiffness. The content of the material for MIM base 302 can be varied according to the needs of a particular drive application. A magnetic MIM base having high magnetic permeability and low coercivity can form part of the magnetic loop of the voice coil motor and actuator mechanism as well as part of the magnetic loop for the spindle motor. In particular, MIM base 302 can be a soft magnetic metal such as various permalloys, permendur, 1010 steel, iron and etc. A soft magnetic metal injection molded base can help protect a data storage system from external magnetic interference.

MIM base 302 includes a metal injection molded (MIM) platform 303 and at least one metal injection molded (MIM) three-dimensional feature 304. MIM platform 303 and the at least one MIM three-dimensional feature 304 forms a single, rigid structure. The at least one MIM three-dimensional feature 304 is integrally and simultaneously formed with the MIM platform 303 to form MIM base 302. Example MIM three-dimensional features include components that were originally force fit components in the example stamped base 202 of FIGS. 2 and 3. An example of a molded and integrally formed features includes PCB screw nuts 306 for attaching a PCB, such as PCB 136 illustrated in FIG. 1, to MIM base 302. Other examples include a ramp stopper 308, an actuator shaft 310 for supporting an actuator mechanism, such as actuator mechanism 116 in FIG. 1, and a recirculation filter support 318. Although FIG. 5 illustrates a base 302 having three-dimensional features 304, those skilled in the art should recognize that other molded three-dimensional features that are formed integrally and simultaneously with MIM platform 303 can be added to the base without introducing any further costs.

Figure 6:
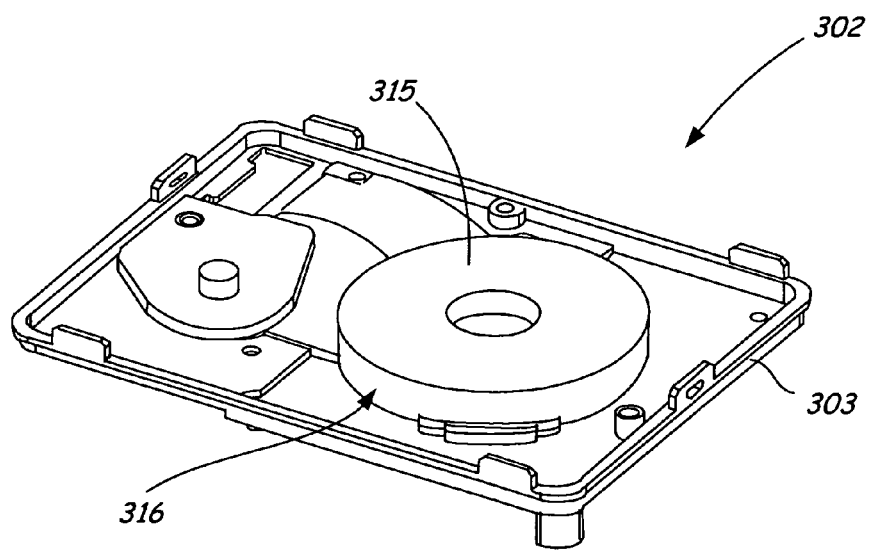
FIG. 6 illustrates a bottom perspective view of a metal injection molded base of a data storage system.

Another example MIM three-dimensional feature includes a motor housing 316 illustrated in FIG. 5 and illustrated in the bottom perspective view of MIM base 302 of FIG. 6. Motor housing 316 is recessed from a top surface 305 into platform 303. Motor housing 316 is configured to house a spindle motor that rotates a medium about an axis. Although it is shown in FIG. 5, it is more clearly shown in FIG. 6 that motor housing 308 includes a continuous and unbroken floor 315. Forming the MIM three-dimensional floor 315 does not require through holes to accommodate the high thickness variations needed for providing an area for the spindle motor stator coils or windings as does the stamped base shown in the examples illustrated in FIGS. 2-4. Unlike the stamped base shown in the example illustrated in FIGS. 2-4, the lack of through holes eliminates any potential additional costs for sealing as well as potential ambient air and humidity leakage internal to the enclosure of a disc drive. In addition, the lack of through holes causes the local stiffness of motor housing 316 to be higher than that of a stamped motor housing, such as motor housing 216 illustrated in FIG. 2.

Referring to FIG. 5, the interface between MIM base 302 and a disc drive component mounted to platform 303 is better than the interface between a stamped base, such as base 202, and a disc drive component. Corner radiuses established by metal injection molding are much smaller than that of a stamping technology. The smallest corner radius that can be achieved by metal injection molding is almost near zero. However, the smallest outside bending radius by stamping ranges between 0.3 mm and 0.6 mm. For example, small corner radiuses of a voice coil motor connector hole 317 are desirable for attachment of a voice coil motor. The corner radius of voice coil motor connector hole 317 for MIM base 302 is less than 0.1 mm. In comparison, the corner radius of a voice coil motor connector hole of a stamped base is greater than 0.3 mm. In addition, small form factor disc drives desire small corner radiuses due to the limited space available on the base.

Figure 7:
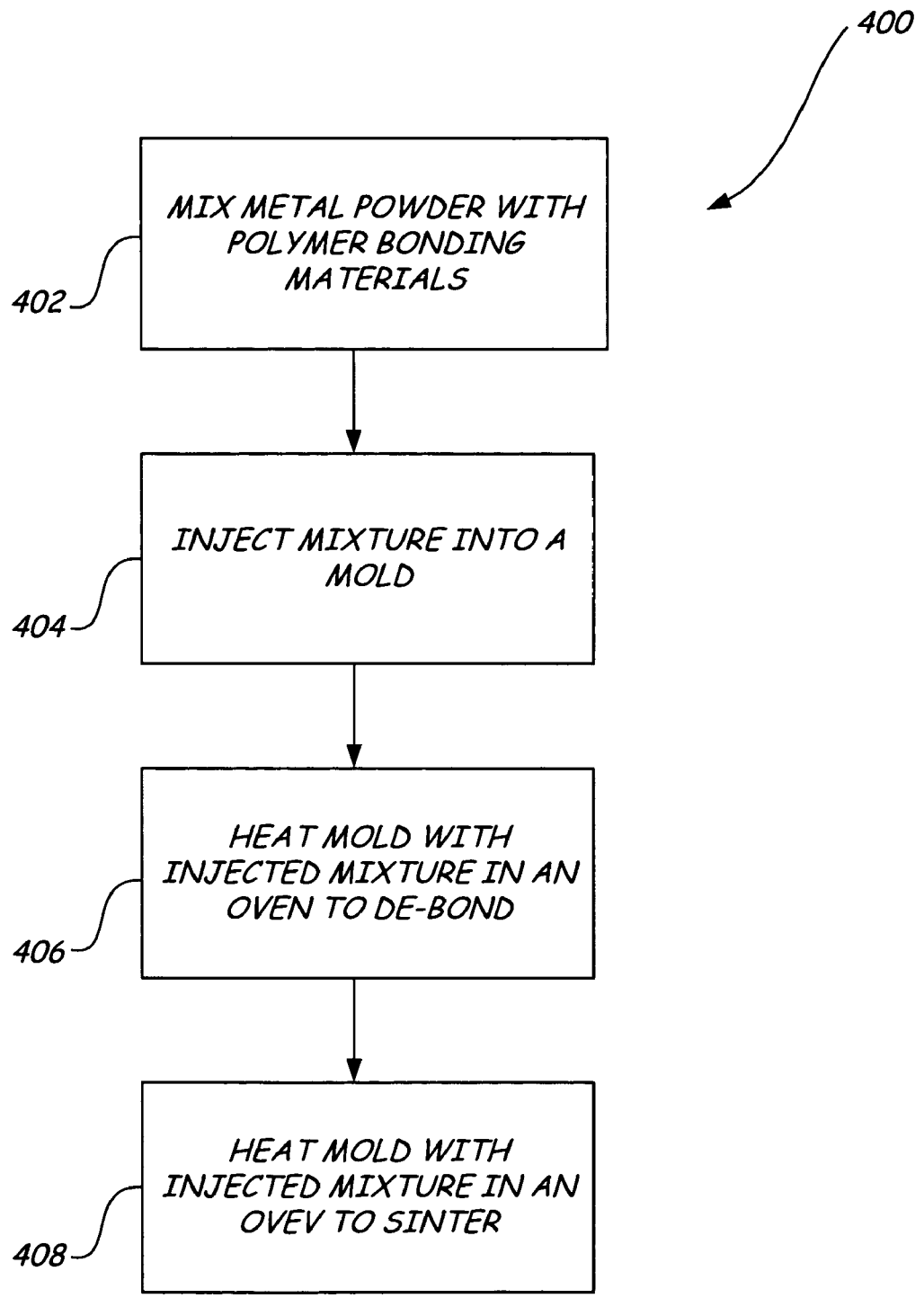
FIG. 7 is a flowchart illustrating a process of forming a metal injection molded base.

FIG. 7 illustrates a flowchart 400 illustrating several important processes of metal injection molding of a MIM base. At block 402, metal powder of a select metal or combination of metals is mixed together with polymer bonding materials. The metal powder of select metal or combination of metals can be magnetic or non-magnetic. Examples of which are discussed above in accordance with the types of metals that a MIM base are made from. After mixing, the mixture is injected into an appropriate mold at block 404. The mold has a shape that corresponds to a base of a disc drive, such as MIM base 302 of FIG. 3. The mold is adapted to form a platform, such as MIM platform 303, and adapted to form three-dimensional features, such as MIM three-dimensional features 304, that are integral with the platform.

The mold, containing the injected mixture, is heated in an oven for de-bonding at block 406. The oven is set at a temperature of approximately 600° C. for the de-bonding process. After de-bonding, all of the polymer bonding material will be removed or burnt and only the metal powder material is left. At block 408, the mold containing the injected metal or combination of metals is heated in an oven for sintering. The oven is set at a temperature of approximately 1000° C. for sintering. In the sintering process, the metal powder will stick to each other and form the solid metal base. The solid metal base, after the sintering process, is removed from the mold, cleaned and is therefore suitable for disc drive application. However, the solid metal base can also be put through a machining process for re-sizing to achieve desirable dimensional tolerances and geometrical tolerances for critical features.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the data storage system while maintaining substantially the same functionality without departing from the scope and spirit of the present invention. In addition, although the preferred embodiment described herein is directed to a base for a data storage system, it will be appreciated by those skilled in the art that the teachings of the present invention can be applied to other types of structures, without departing from the scope and spirit of the present invention.

What is claimed is:

1. A data storage system comprising:
    an injection molded base including:
        a metal injection molded platform; and
        at least one metal injection molded three-dimensional feature formed integrally and simultaneously with the metal injection molded platform, the at least one three-dimensional feature configured to mount data storage system components to the platform and comprising an actuator shaft protruding from the metal injection molded platform.

2. The data storage system of claim 1, wherein the injection molded base comprises a non-magnetic metal.

3. The data storage system of claim 2, wherein the non-magnetic metal base comprises one of a stainless steel and an aluminum alloy.

4. The data storage system of claim 1, wherein the metal injected molded base comprises a magnetic metal.

5. The data storage system of claim 4, wherein the magnetic metal base forms part of a magnetic circuit with a voice coil motor of an actuator mechanism and forms part of a magnetic circuit with a spindle motor.

6. The data storage system of claim 4, wherein the magnetic metal comprises a soft magnetic metal.

7. The data storage system of claim 6, wherein the soft magnetic metal comprises one of a permalloy, permendur, 1010 steel and iron.

8. The data storage system of claim 1, wherein the at least one three dimensional feature further comprises one of a printed circuit board screw nut, a ramp stopper and a recirculation filter support.

9. A method comprising:
    obtaining an injection molded base that has a metal injection molded platform and a metal injection molded three-dimensional feature that is formed integrally and simultaneously with the metal injection molded platform, the metal injection molded three-dimensional feature comprises a shaft protruding from the platform; and
    mounting a data storage system component to the three-dimensional feature, wherein the data storage system component comprises an actuator configured to be mounted to the shaft.

10. The method of claim 9, wherein obtaining an injection molded base comprises obtaining an injection molded base including a non-magnetic metal comprising at least one of a stainless steel and an aluminum alloy.

11. The method of claim 9, wherein obtaining an injection molded base comprises obtaining an injection molded base comprising a magnetic metal, wherein the magnetic metal base forms part of a magnetic circuit with a voice coil motor of an actuator mechanism and forms part of a magnetic circuit with a spindle motor.

12. A data storage system comprising:
an injection molded base including:
a metal injection molded platform; and
at least one metal injection molded three-dimensional feature formed integrally and simultaneously with the metal injection molded platform, the at least one three-dimensional feature configured to mount data storage system components to the platform and comprising a motor housing, the motor housing is recessed into the platform from a top surface of the platform and includes a continuous, unbroken floor.

* * * * *

UNITED STATES PATENT AND TRADEMARK OFFICE
CERTIFICATE OF CORRECTION

PATENT NO. : 7,616,401 B2 Page 1 of 1
APPLICATION NO. : 11/241038
DATED : November 10, 2009
INVENTOR(S) : Xu et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1004 days.

Signed and Sealed this

Nineteenth Day of October, 2010

David J. Kappos
*Director of the United States Patent and Trademark Office*